June 2, 1936. A. E. PAGE Re. 19,995

YARN CUTTER AND CLAMP FOR KNITTING MACHINES AND METHOD OF OPERATING SAME

Original Filed July 19, 1927 · 4 Sheets-Sheet 1

INVENTOR
ALBERT E. PAGE
BY HIS ATTORNEYS

Howson and Howson

June 2, 1936. A. E. PAGE Re. 19,995

YARN CUTTER AND CLAMP FOR KNITTING MACHINES AND METHOD OF OPERATING SAME

Original Filed July 19, 1927 4 Sheets-Sheet 2

INVENTOR
ALBERT E. PAGE
BY HIS ATTORNEYS

Howson and Howson

June 2, 1936. A. E. PAGE Re. 19,995
YARN CUTTER AND CLAMP FOR KNITTING MACHINES AND METHOD OF OPERATING SAME
Original Filed July 19, 1927 4 Sheets-Sheet 3
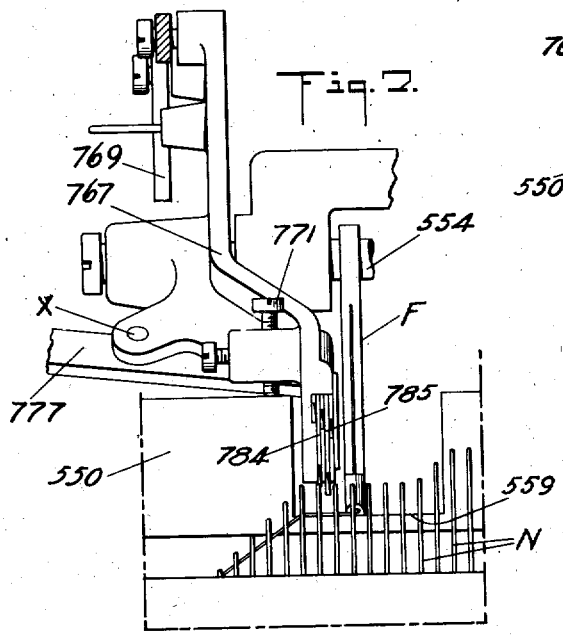
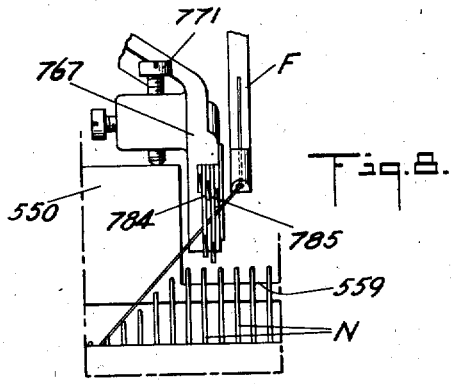
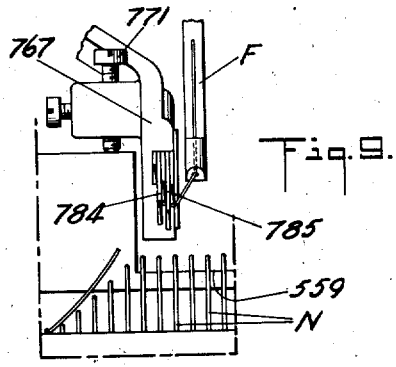
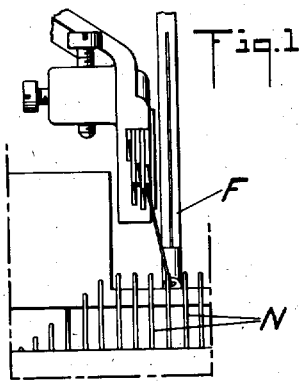
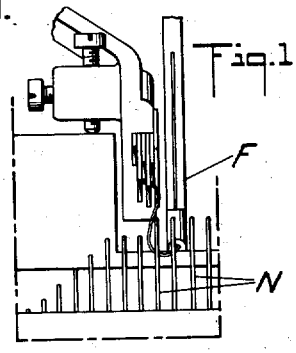
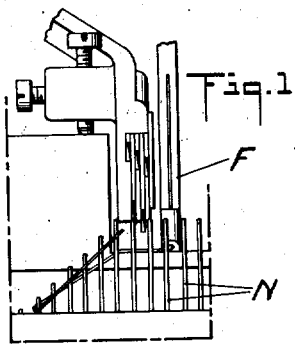
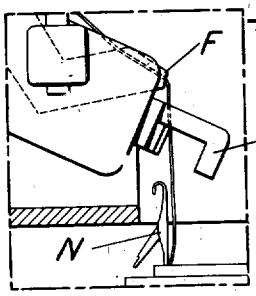
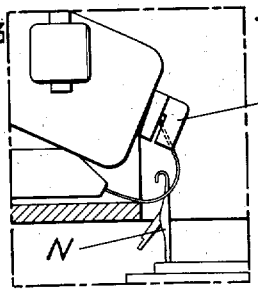
INVENTOR
ALBERT E. PAGE
BY HIS ATTORNEYS
Howson and Howson June 2, 1936. A. E. PAGE Re. 19,995
YARN CUTTER AND CLAMP FOR KNITTING MACHINES AND METHOD OF OPERATING SAME
Original Filed July 19, 1927 4 Sheets-Sheet 4
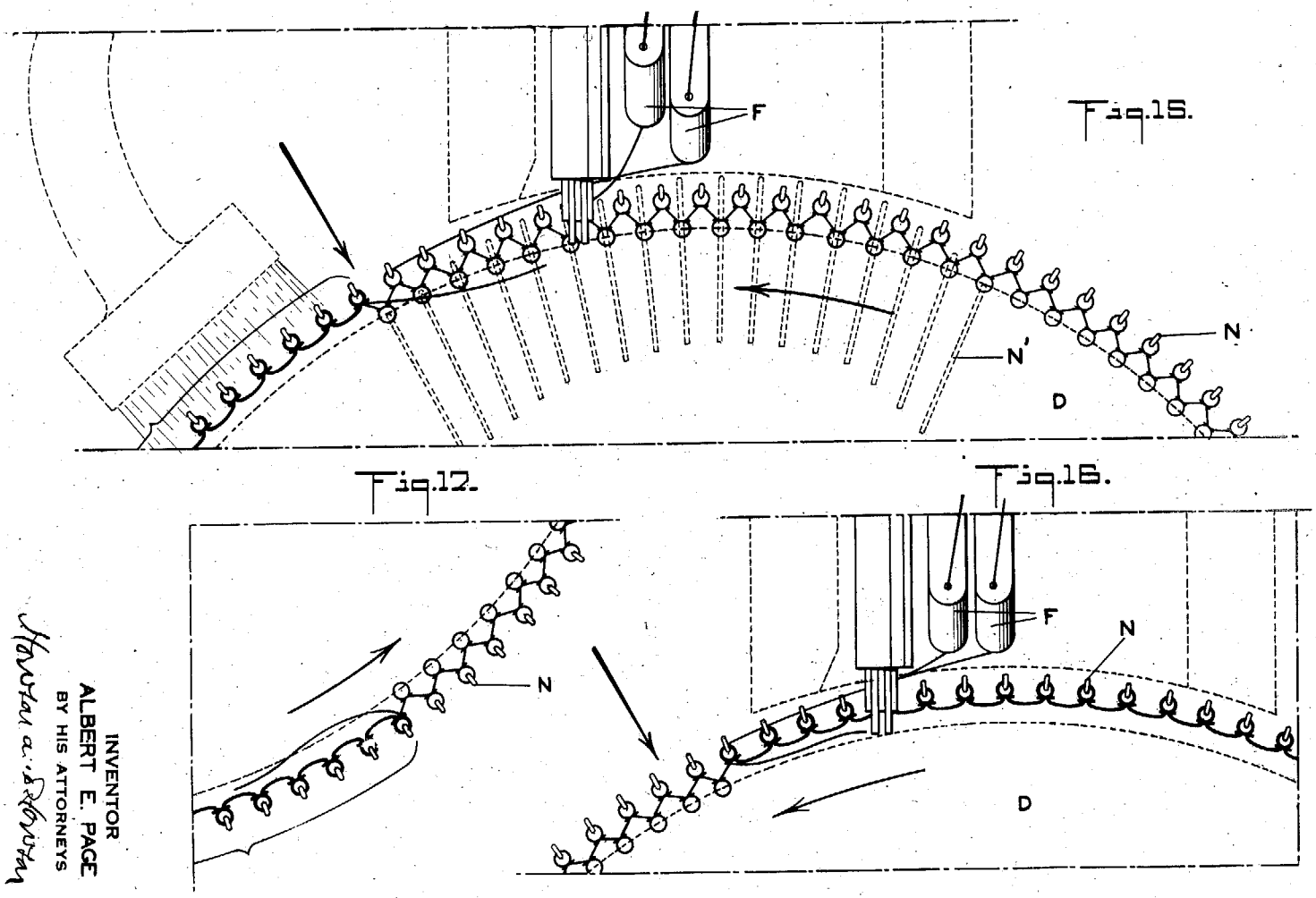
INVENTOR
ALBERT E. PAGE
BY HIS ATTORNEYS
Howson and Howson Reissued June 2, 1936

Re. 19,995

UNITED STATES PATENT OFFICE 19,995

YARN CUTTER AND CLAMP FOR KNITTING MACHINES AND METHOD OF OPERATING SAME

Albert E. Page, Brooklyn, N. Y., assignor to Scott & Williams, Incorporated, New York, N. Y., a corporation of Massachusetts Original No. 1,860,265, dated May 24, 1932, Serial No. 206,986, July 19, 1927. Application for reissue October 1, 1932, Serial No. 635,871

33 Claims. (Cl. 66—134)

This invention relates to cutters and clamps for knitting machines and more particularly to a method of operating a high splicing cutter and clamp for circular knitting machines having a dial. Cutters and clamps heretofore used for sectional splicing yarns have been located inside the needle circle below the throatplate in order that the yarn may get into the clamp as quickly as possible. In machines having dials there is not room inside the needle circle for a cutter and clamp at that level, and it is one purpose of the present invention to produce a cutter and clamp for sectional splicing which is adapted to be used in machines having dials. Another object of the invention is to provide a method of inserting the yarn which is quick and positive.

According to this invention the cutter and clamp may be set above the level of the needles at the throatplate in such a manner as not to interfere with the dial. The clamp causes insertion of the yarns by its own movement by forming a loop in the yarn and then offering that loop to the needles. According to this method the yarn finger is lowered to its feeding point before it is time to insert the yarn, and the cutter is raised from its normal position to a higher one before the yarn is inserted. This is done in such manner as to form a slack in the yarn and when it is time to insert the yarn, the cutter and clamp are merely dropped down nearer the yarn finger, thus throwing the loop of yarn in the path of the needles. The yarn is removed from the needles and given to the cutter and clamp by raising the yarn finger to non-feeding position, the raising of the cutter and clamp occurring before or after the removal of the yarn, as desired.

In the drawings the invention will be shown in the well known Scott & Williams type of seamless hosiery machine in which the needle cylinder revolves and the cam-cylinder is stationary, but it should be understood that the method and mechanism are both applicable to other types of machines.

In the drawings—

Fig. 4 is a vertical longitudinal sectional view through the cutter and clamp;

Figs. 7 to 12 are views of successive operations looking at the throatplate from the front of the machine, Fig. 7 showing the splicing yarn finger feeding to the needles;

Fig. 8 is a similar view showing the yarn finger lifted and holding the yarn in the jaws of the cutter and clamp;

Fig. 9 is a similar view after the yarn has been cut and clamped;

Fig. 10 is a similar view showing the yarn finger lowered to operative position but the cutter and clamp raised;

Fig. 11 is a similar view showing the cutter and clamp offering a loop of yarn to the needles;

Fig. 12 is a similar view just as the clamp lets go of the yarn;

Fig. 13 is a side elevation corresponding to Fig. 8;

Fig. 14 is a side elevation corresponding to Fig. 11;

Fig. 15 is a fragmentary view showing in plan the auxiliary cutting and clamping mechanism and some of the yarn guides and showing the relation of these parts to the cylinder and dial needles, the needles of the cylinder and dial being positioned as at the start of rib knitting in a course in which both rib and plain knitting occurs;

Fig. 16 is a view similar to Fig. 15 but showing the cylinder and dial needles positioned substantially at the start of plain knitting in a course; and Fig. 17 is a fragmentary view showing a few needles at each side of the needle at which plain knitting starts and illustrating the position to which the end of the reinforcing yarn is swept by the brush of Fig. 15.

Figure 1:
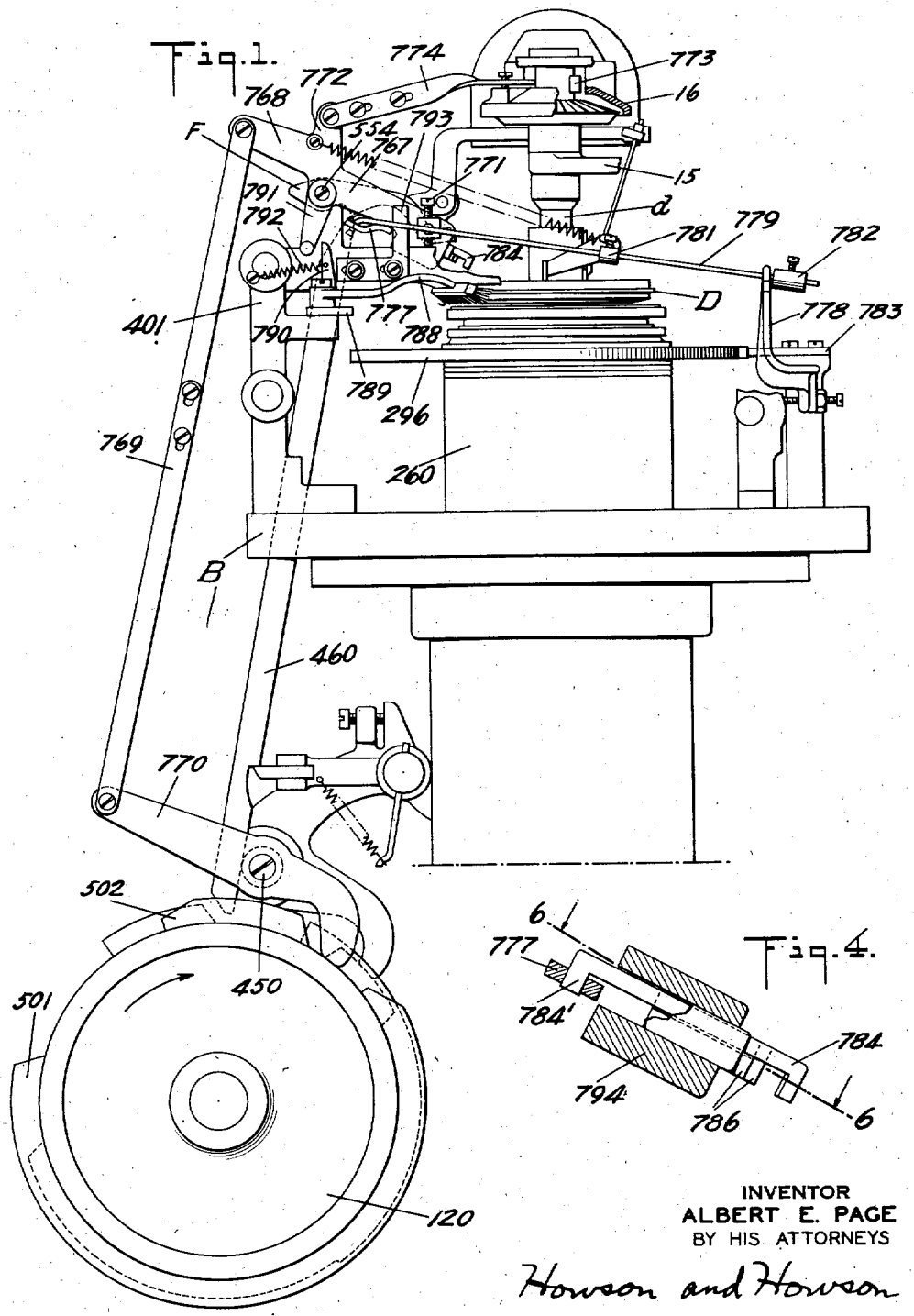
Fig. 1 is a side elevation of a seamless ribbed hosiery machine showing the new high splice cutter and clamp and the mechanism operating it.
Figure 2:
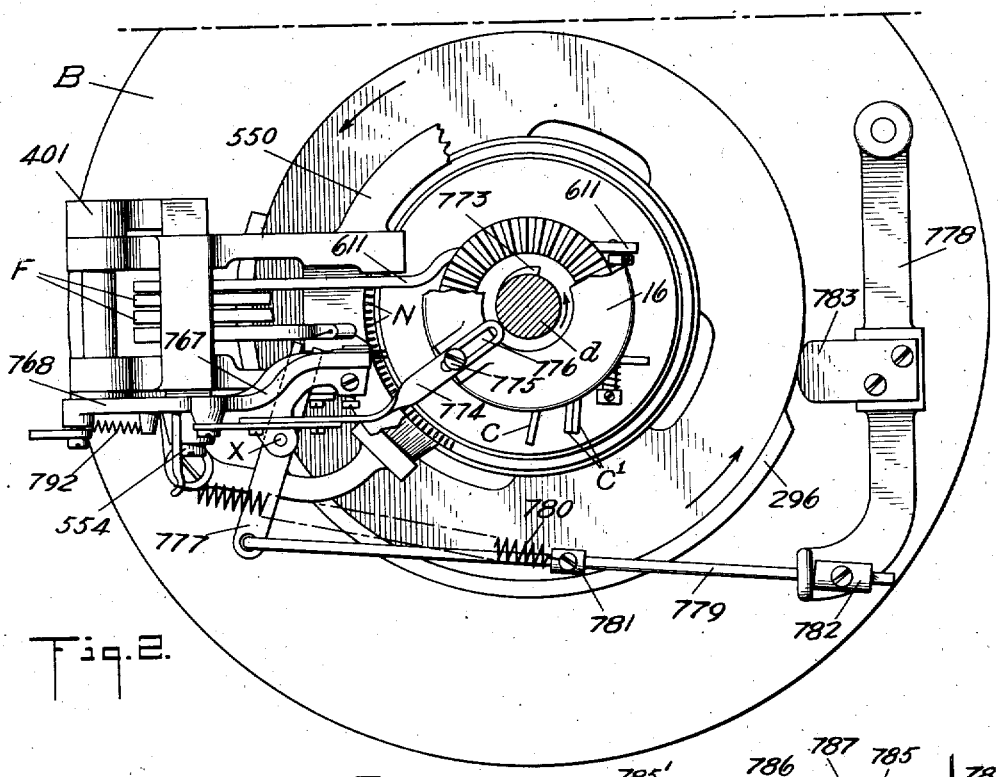
Fig. 2 is a plan view of the head of the machine shown in Fig. 1.

Referring to the drawings, there are the usual needle cylinder 260 with independent latch needles N vertically movable therein, yarn fingers F pivotally mounted on a stud 554 on the latch ring 550 which in turn is pivoted on the upright bracket 401 on the bedplate B of the machine. These yarn fingers are adapted to be lifted out of action and dropped into action by the usual thrust rods 460 operating from cams on the surface of the main pattern drum 120, as usual. Suspended above the needle cylinder 260 by means of a bracket 15 fastened on the latch ring 550 is a dial spindle *d* carrying a dial D which carries secondary knitting instruments N' and the ordinary cutter *c'* and clamp *c* (Fig. 2).

In order to cut and clamp successfully yarns which are thrown into and out of action frequently at borders of predetermined segments of the fabric, such for instance as in the case of split foot stockings or high splicing at the heel, it is necessary to provide a special cutter and clamp. Heretofore, these cutters and clamps for sectional splicing have been of the general type shown in the patent to Robert W. Scott, No. 1,274,338, dated July 30, 1918. With this type of cutter the splicing yarns are inserted by bringing the yarn finger into feeding position—the cutter and clamp being set at a point below the level of the needles as they pass the throatplate. In any circular knitting machine having a dial, such for example as the machine shown in the U. S. patent of Robert W. Scott 1,641,554, there is not sufficient room above the dial for the sectional splicing cutter and clamp such as has been heretofore known.

Figure 5:
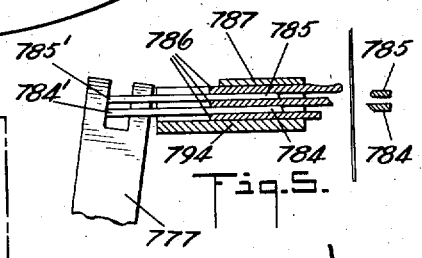
Fig. 5 is a plan view from below, partially in section, showing the cutter and clamp before it has operated on the yarn.
Figure 6:
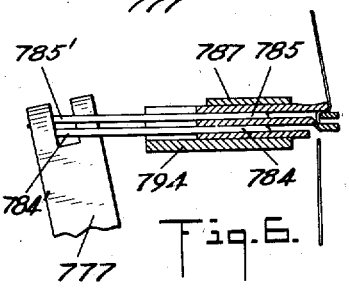
Fig. 6 is a view similar to Fig. 5 after the yarn has been cut and clamped.

In the example shown in the drawings the new sectional splicing cutter and clamp is carried by a bracket 767 pivoted on an extension of the stud 554 lying outside the yoke of the latch ring 550. The cutter and clamp proper consists of a slotted frame 794 from which the cutting blade 784 and the clamp blade 785 project inwardly and downwardly over the needles. Between and on either side of the cutting and clamping blades are guide members 786 held fixedly in the frame by a cover plate 787 (Figs. 4, 5 and 6). The cutting and clamping blades have hooked forward ends to catch the yarns, the inner edge of the cutting blade being sharpened. These two blades slide longitudinally of the frame in cutting, clamping and releasing the yarns, being actuated by an operating lever 777 pivoted at X on the cutter bracket 767, and connected to the feet 784' and 785' of the blades. The operating lever is actuated by the following mechanism from a peripheral cam 296 on the usual sinker ring revolving with the needles. There is a swinging arm 778 carrying a finger 783 engaging the cam 296 and a wire 779 connected to the operating lever 777 and passing through the free end of the swinging arm 778. On the end of the wire is a collar 782 and there is a spring 780 tending to hold the finger 783 against the cam 296, the spring being stretched between the cutter and clamp bracket 767 and a collar 781 on the wire 779 near its mid-point. This spring serves to open the clamp and cutter when permitted by the cam 296.

When the machine is knitting portions of the stocking where sectional splicing is not being done, the sectional cutter and clamp can be raised out of action from the main pattern drum 120 by a rearwardly extending arm 768 on the bracket 767. This arm 768 is connected to a thrust rod 769 pivoted to one arm of a cam lever 770 mounted on a stud 450 on the frame of the machine. The free end of this cam lever lies in one of the cam paths on the main pattern drum 120. When the cam lever 770 rides up on a cam 501 or 502 on the main pattern drum, the cutter and clamp is lifted out of operative position. Except during sectional splicing the sectional splicing yarn is held by the main cutter and clamp *c'* and *c*.

It is necessary that the sectional cutter does not operate except during sectional splicing. For this purpose there is a lug 793 on the latch ring 550 lying just in front of the operating lever 777 between the pivot point of that lever and the point where it engages the feet 784' and 785' of the cutter blade 784 and the clamping blade 785 and the parts are so adjusted that when the cam 501 or 502 on the main pattern drum lifts the sectional cutter and clamp out of action, the lever 777 in its upward travel will bear against the lug 793 and will be moved about its pivot X, thereby shifting the wire 779 to put the collar 782 in a position such that swinging of the arm 778 caused by the cam 296 will be ineffective to move the wire 779 and the lever 777. In such position the cam 296 does not operate the cutter and clamp. This prevents yarns in the inactive yarn fingers from being severed by this cutter while out of action.

According to the embodiment of the invention being described, the yarn is fed to the needles by dipping the clamp downwardly. The position of the cutter and clamp is above the needles at the throatplate and above the feeding level of the yarn fingers. The lowermost position of the cutter and clamp is determined by means of an adjusting screw 771 on the forward end of the cutter bracket 767 and resting on top of the latch ring 550 opposite the usual throatplate 559. To raise and dip the cutter and clamp the dial revolving in time with the needle cylinder is availed of. On the bracket 767 is an upright arm 772 which is operated by a horizontal positioning cam 773 on the dial spindle *d* by means of an adjustable link 774. This link passes over the top of the dial gear casing 16 and is held in position thereon by a screw 775 playing in the slot 776 in the link. This cam 773 on the dial spindle is availed of to raise the clamp for pulling in the slack and then dropping the clamp, thus pushing the loop of yarn down into the path of the needles.

The sectional splicing yarn finger may be actuated through its thrust rod 460 by mechanism such as shown and described in the patent to Robert W. Scott dated July 30, 1918 Number 1,274,338.

To insure that the ends of the sectional splicing yarns which have been cut off do not project downwardly between the needles and thus come through to the right side of the finished fabric, a brush 788 is placed near the needles at the knitting point, this brush tending to sweep the ends of the yarns inside the needle circle. In order that this brush may be taken out of action when the sectional splicing cutter and clamp goes out of action the brush is pivotally mounted on a bracket 789 having a lug 790 lying in the path of a downwardly projecting arm 791 of the cutter bracket 767. There is a spring 792 tending to hold the brush in position and the parts are so adjusted that when the cutter bracket 767 is raised out of action by a cam on the main pattern drum, this downwardly depending projection 791 of the cutter bracket 767 will cause the brush 788 to be pulled out of contact with the circle of needles.

Figure 3:
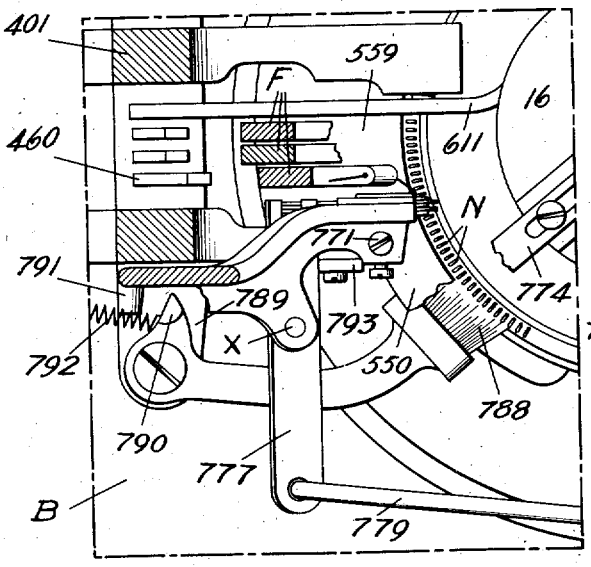
Fig. 3 is a plan view on an enlarged scale of a portion of the head of the machine showing the cutter and clamp.

Having now described the construction of the novel parts of the invention, the operation of the device will be set forth. Assuming that a stocking is being knit from toe to top, the starting up course, looper's rounds and toe are made in the usual manner. The next piece of fabric to be made is the foot which has a spliced sole. At this point the main pattern drum 120 is racked ahead and the cam lever 770 drops off the cam 501. The spring 780 pulls the yarn cutter bracket 767 down until its adjusting screw 771 rests on the latch ring bracket 550 in which position the cutter and clamp are down in their lower position over the needles. The arm 791 also allows the spring 792 (Fig. 3) to swing the brush 788 into position for action. The same movement of the main pattern drum 120 causes the thrust rod controlling the splicing yarn finger to drop down and the splicing yarn to be fed to the needles beginning on the sectional needles having low butts in the well known manner (Fig. 7). After the segment of the needles knitting the sole of the stocking have taken the yarn, the splicing finger is lifted out at the last medium butt needle and the splicing yarn is raised into and caught inside the hooked forward ends of the cutter blade 784 and clamping blade 785 (Figs. 8 and 13). At this point the finger 783 of the swinging arm 778 come in contact with the leading end of the peripheral cam 296 causing the lever 777 to withdraw the cutter blade 784 and the clamping blade 785 into the guide members 786 cutting and clamping the yarns (Fig. 9). The cooperation of the clamp and yarn finger in offering yarn to the needles will now be set forth.

When the revolution of the needle cylinder brings the first needle which is to receive the splicing yarn on the next course about 1½ inches away from the splicing finger, that splicing finger is dropped down into operative position by its thrust rod 460 and simultaneously the cam 773 on the dial spindle causes the cutter and clamp to be raised about ¼ of an inch (Fig. 10). This raising of the cutter and clamp could have been caused before the yarn finger was raised, if so desired. This movement draws an extra length of yarn between the yarn finger and the cutter and clamp. At this moment the yarns are passing above the needles at the throatplate. The adjustable link 774 rides off the cam 773 on the dial spindle *d* just in time for the cutter and clamp to drop down and throw a loop in front of the first needle which is to take the splicing yarn (Figs. 11 and 14). The finger 783 then rides off the peripheral cam 296 and the yarn is released to be knit in (Fig. 12). This loop-throwing yarn cutter and clamp is so active that it is not necessary to separate the needles into different levels to insure the sectional splicing yarns always being fed to approximately the same needles but the mechanism required for the new cutter and clamp does not interfere in any way with the provision of means to thus separate the yarns into additional levels if desired (see Fig. 11).

From Figure 14, which shows the yarn inserting positions of the yarn finger and clamp it will be seen that the length of yarn between the yarn engaging portion of the clamp and the eye of the yarn finger is greater than the spacing between said portion and eye, and that therefore a loop of yarn exists between them and extends into the path of the needles. The manipulation of the yarn finger and clamp previous to their arrival at their respective yarn inserting positions are for the purpose of drawing such a length of yarn between them.

The cycle of operations just described continues until the heel is reached at which point the cam lever 770 rides up onto its heel cam 502 which raises the cutter and clamp and the bracket 767 entirely above the latch ring bracket 550 making it possible to manipulate any gap closing ring. This raising of the sectional cutter and clamp preferably takes place just before the high splicing yarn finger is lifted out in order that the regular cutter *c'* and clamp *c* mounted on the dial cap may cut and hold the sectional splicing yarn until sectional splicing is resumed. The raising of the cutter and clamp also swings the brush 788 away from the needle circle and pushes the lever 777 until the finger 783 cannot operate the sectional cutter. It might be noticed also that this lifting of the cutter and clamp also causes the adjustable link 774 to be withdrawn from contact with the cam 773 on the dial spindle thus obviating any possibility of the link catching on the cam during reciprocating knitting in the heel or toe as the case may be.

The heel is then knit and the yarn cutter bracket 767 brought down into operative position again as at the beginning of the foot for knitting of the high splice above the heel pocket. The operation of the parts during the formation of the high splice is essentially similar to that when making the spliced sole on the foot and will be obvious to any one skilled in the art.

In the knitting of the reinforced portions of seamless ribbed hosiery on the machine shown in the drawings the reinforcing yarn is applied to plain knitted portions. The reinforcing yarn may be supplied to the leading needle of the plain knitted portion as shown in Fig. 16 and withdrawn after being supplied to the other end needle of the plain knitted portion as shown in Fig. 15, although the reinforcing yarn is not necessarily supplied throughout the full extent of the plain knitted portions. After being withdrawn from the needles, the reinforcing yarn is floated between the last needle knitting the reinforcing yarn and the yarn finger until the reinforcing yarn is cut and clamped as previously described. The ends of the reinforcing yarn in each course are swept by the brush between the cylinder and dial needles inside the needle circle.

The advantages of this novel method of and mechanism for inserting yarn will be obvious to those skilled in the art, and I do not wish to be limited in the uses to which it may be put.

What I claim is:

1. A method of inserting yarn for knitting which comprises first lowering toward its feeding point a yarn finger containing the yarn and then offering that yarn to the needles by movement of a clamp holding the yarn.

2. A method of inserting yarn for knitting which comprises first lowering toward its feeding point a yarn finger containing the yarn and then offering that yarn to the needles by dipping a clamp holding the yarn.

3. A method of inserting yarn for knitting which comprises first lowering to its feeding point a yarn finger containing the yarn, then forming a loop in the yarn and offering that loop to the needles by movement of a clamp holding the yarn.

4. A method of inserting yarn for knitting which comprises first moving a yarn finger toward its feeding position and then bringing a clamp nearer the yarn finger in such manner as to throw the yarn between the clamp and finger into a loop in the path of the needles.

5. A method of splicing yarns in knitting in which the yarn finger raises the yarn into a cutter and clamp located above the throatplate, and in the same course the yarn is fed to the needles by first lowering the yarn finger and then dipping the clamp.

6. A method of splicing in knitting in which the yarn is taken out of action and put into a cutter and clamp at one point in a course by raising the yarn finger and in the same course the yarn is fed to the needles by drawing slack in the yarn by means of raising the clamp and lowering the yarn finger to feeding position and then throwing a loop of yarn into the path of the needles by dipping the clamp.

7. A method of inserting a yarn for knitting which comprises drawing between a yarn finger and a yarn clamp a yarn portion longer than the spacing between the yarn engaging portion of the clamp and the eye of the yarn finger when said elements are in their respective yarn inserting positions, and putting said portion in the path of the needles in the form of a loop by movement of said elements toward their yarn inserting positions.

8. A method of inserting a yarn for knitting which comprises manipulation of a yarn finger and a yarn clamp to draw between them a length of yarn and to put said length of yarn in the path of the needles in the form of a loop when said yarn finger is in its yarn feeding position.

9. A method of inserting a yarn for knitting which comprises drawing a length of yarn between a yarn clamp and a yarn finger by relative movement therebetween and putting said yarn in the path of the needles by movement of the yarn clamp toward said needle path while said yarn finger is in its yarn feeding position.

10. In a knitting machine, a series of needles, a yarn finger movable to and from its yarn feeding position, a yarn clamp adapted to receive and clamp the yarn when moved from said needles by said yarn finger, means for operating said clamp and said yarn finger, said means being adapted to move said clamp and finger to draw a length of yarn between them and to move said finger to its yarn feeding position and then to move said clamp while said finger is in yarn feeding position to put said length of yarn in the path of said needles.

11. A circular knitting machine having a circle of needles and a splicing yarn finger adapted to feed yarn to a group of said needles, in combination with a cutter and clamp for said yarn and means adapted during each of a plurality of courses to actuate said cutter and clamp and to dip the clamp to cause a bight of the yarn to be offered to the needles during each of said courses.

12. A circular knitting machine having a rib dial, a circle of cylinder needles and a splicing yarn finger adapted to feed yarn to a group of said needles, in combination with a cutter and clamp for said yarn mounted above the dial and means adapted during each of a plurality of courses to actuate said cutter and clamp and to dip the clamp to a level above the dial to cause a bight of the yarn to be offered to the needles.

13. A circular knitting machine having a dial, a circle of cylinder needles and a splicing yarn finger adapted to feed yarn to a group of said cylinder needles, in combination with a cutter and clamp for said yarn and means adapted during each of a plurality of courses to actuate said cutter and clamp and to throw a loop of yarn into the path of the cylinder needles by a dipping movement of the clamp.

14. A circular knitting machine having a rib dial, a circle of cylinder needles and a splicing yarn finger adapted to feed yarn to a group of said cylinder needles, in combination with a cutter and clamp for said yarn and means adapted during each of a plurality of courses to actuate said cutter and clamp and to throw the yarn between the clamp and finger into a loop in the path of the needles in advance of the clamp by dipping said clamp.

15. A circular knitting machine having a rib dial, a circle of cylinder needles and a splicing yarn finger adapted to feed yarn to a group of said needles, in combination with a cutter and clamp for said yarn and means adapted during each of a plurality of courses to actuate said cutter and clamp for said yarn and to raise and lower the clamp to cooperate with said yarn finger in offering yarn to the needles at a level below the clamp, and means for moving said cutter and clamp out of active position and for rendering them inoperative when so moving.

16. A circular knitting machine having a circle of needles, a splicing yarn finger adapted to feed yarn to a group of said needles and a cutter and clamp to receive the yarn when moved from the needles by said finger, in combination with means for effecting relative movement between said clamp and yarn finger during each of a plurality of courses to draw a length of yarn between them and for moving the clamp to offer that length of yarn to the needles by dipping the clamp.

17. A method of knitting consisting in feeding at least one thread to two sets of needles and simultaneously therewith feeding at least one additional thread to a portion only of one of the said sets of needles, withdrawing the last named thead or threads from feeding relation with the needles and severing the additional thread while knitting.

18. A method of knitting consisting in feeding at least one thread to two sets of needles to knit rib fabric, feeding at least one additional thread for partial courses to a portion only of the plain needles, withdrawing the last named thread or threads from feeding relation with the needles during the knitting of each of several courses and severing the additional thread while knitting.

19. A method of knitting consisting in feeding at least one thread to a set of rib needles and to a set of plain needles, feeding at least one additional thread to a portion only of the plain needles, floating the thread or threads last mentioned and severing the floats while knitting.

20. The steps of knitting adjacent courses of partly rib and partly plain, circular fabric and including the knitting in of at least one reinforcing thread throughout the plain portion of the fabric only, floating the thread and then during the knitting of courses severing the floats near the last reinforced wale.

21. A method of knitting consisting in feeding at least one thread to two sets of needles and simultaneously therewith feeding at least one additional thread to some of the needles of one set of needles, severing the said additional thread at least once during the knitting of each course in which the additional thread is fed to some of the needles.

22. A knitting machine including a needle dial and a needle cylinder, means for feeding a body thread to cylinder and dial needles and a reinforcing thread to cylinder needles so as to reinforce adjacent plain wales, the means for feeding the reinforcing thread to the cylinder needles being adapted to feed such thread to such cylinder needles for partial courses only, and said reinforcing thread being caused to float from the feeding means to the last needles knitting the said reinforcing thread during the knitting of each partially reinforced course, in combination with means for severing the said floats during the knitting of each course.

23. A knitting machine including a needle dial and a needle cylinder, means for feeding a body thread to cylinder and dial needles and a reinforcing thread to cylinder needles so as to reinforce adjacent plain wales, the means for feeding the reinforcing thread to the cylinder needles being adapted to feed such thread to such cylinder needles for partial courses only, and said reinforcing thread being caused to float from the feeding means to the last needle knitting the said reinforcing thread during the knitting of each partially reinforced course, in combination with means for severing the said floats during the knitting of each course, the means for feeding the reinforcing thread to the needles being automatically controlled to move to and from thread feeding position at least once during the knitting of each reinforced course.

24. A dial cap having cams on one face thereof for controlling dial needles, in combination with main and auxiliary means for severing thread.

25. A circular knitting machine including a needle dial and a needle cylinder, in combination with means for feeding a reinforcing thread to some of the cylinder needles during the knitting of some at least of the circular courses of the stocking or other fabric, and means acting in conjunction with the means first mentioned automatically to discontinue the feeding of such thread during the knitting of courses other than those first mentioned, other means adapted to be controlled automatically so as to sever the reinforcing thread adjacent to one, at least, of the wales defining the reinforcing area during the knitting of each reinforced course, and adapted to control the action of the severing means whereby the latter is rendered inactive during the knitting of courses other than the reinforced courses.

26. A circular knitting machine of the independent needle type including a needle dial and needle cylinder each of which has needles independently mounted therein, means for feeding at least one thread to the needles and an additional thread to some of the needles in such a manner as temporarily to cause said additional thread to float from the feeding means to the last needle knitting the said additional thread during the knitting of each partially reinforced course, in combination with means for severing the floats adjacent to the last knitted, reinforced wales of each course.

27. A knitting machine including two needle beds adapted to knit either rib or plain fabric, means for feeding the body thread to cooperating needles in each needle bed and a reinforcing thread to needles in one of the beds so as to reinforce adjacent plain wales, the means for feeding the reinforcing thread to the needles in one of the needle beds being adapted to feed such thread to such needles for partial courses only, the said reinforcing thread being caused to float from the feeding means to the last needle knitting the said reinforcing thread during the knitting of each partially reinforced course, in combination with means for severing the said floats during the knitting of each course.

28. A circular knitting machine of the independent needle type including two needle beds each of which has needles independently mounted therein, means for feeding at least one thread to cooperating needles mounted in the two needle beds and an additional thread to some of the needles in one of the needle beds in such a manner as temporarily to cause said additional thread to float from the feeding means to the last needle knitting the said additional thread during the knitting of each partially reinforced course, in combination with means for severing the floats adjacent to the last knitted, reinforced wales of each course.

29. A knitting machine having two needle beds the needles of which are adapted to cooperate to knit rib fabric while at the same time the needles of one needle bed are adapted to knit plain fabric, means for reinforcing the plain fabric, said means including an element for feeding reinforcing thread or yarn to the needles last mentioned, in combination with means for severing such thread or yarn at least once during the knitting of each reinforced course.

30. A knitting machine including a needle cylinder and needle dial each having needles independently mounted therein, the needles being adapted simultaneously to knit adjacent rib wales and other adjacent plain wales, means for reinforcing the plain wales, said means including a guide for feeding the reinforcing thread or yarn to a series of adjacent cylinder needles, in combination with means for severing such thread or yarn at least once during the knitting of each reinforced course.

31. In a knitting machine having cylinder and dial needles for knitting a stocking having ribbed and plain portions, means for supplying a reinforcing yarn to said cylinder needles for a portion of each of a plurality of consecutive courses to provide a reinforced area in said plain portion and means severing said reinforcing yarn in each course in which said reinforcing yarn is knit.

32. In a knitting machine having cylinder and dial needles for knitting a stocking having a ribbed instep and a plain sole, means for supplying a reinforcing yarn to said cylinder needles for a portion of each of a plurality of consecutive courses to provide a reinforced area in said sole and means severing said reinforcing yarn in each course in which said reinforcing yarn is knit.

33. In a knitting machine having cylinder and dial needles for knitting a stocking having a ribbed instep and a plain sole, a yarn guide for supplying a reinforcing yarn to said cylinder needles for a portion of each of a plurality of consecutive courses to provide a reinforced area in said sole and cutting and clamping mechanism operating upon said reinforcing yarn upon removal of said yarn from the needles, said yarn guide and cutting and clamping mechanism cooperating to present a loop of the reinforcing yarn to the cylinder needles upon insertion of said yarn.

ALBERT E. PAGE.

CERTIFICATE OF CORRECTION.

Reissue No. 19,995.

June 2, 1936.

ALBERT E. PAGE.

It is hereby certified that error appears in the printed specification of the above numbered patent requiring correction as follows: Page 3, first column, line 49, for "needles" read needle; page 5, first column, line 36, for "reinforcing" read reinforced; and that the said Letters Patent should be read with these corrections therein that the same may conform to the record of the case in the Patent Office.

Signed and sealed this 11th day of August, A. D. 1936.

(Seal)

Henry Van Arsdale
Acting Commissioner of Patents.